United States Patent [19]

Shawl et al.

[11] Patent Number: 5,725,654
[45] Date of Patent: Mar. 10, 1998

[54] CEMENT COMPOSITION

[75] Inventors: Edward T. Shawl, Wallingford; Xinhau Zhou; Kenneth G. McDaniel, both of West Chester, all of Pa.

[73] Assignee: Arco Chemical Technology, L.P., Greenville, Del.

[21] Appl. No.: 870,779

[22] Filed: Jun. 6, 1997

[51] Int. Cl.$^6$ .................................................. C04B 24/12
[52] U.S. Cl. ........................... 106/727; 106/728; 106/808; 106/823; 524/5
[58] Field of Search ........................... 106/724, 728, 106/823, 727, 696, 808; 524/5

[56] References Cited

U.S. PATENT DOCUMENTS

| | | | |
|---|---|---|---|
| 4,390,645 | 6/1983 | Hoffman et al. | 521/137 |
| 4,814,014 | 3/1989 | Arfaei | 524/4 |
| 4,946,904 | 8/1990 | Akimoto et al. | 524/5 |
| 5,194,493 | 3/1993 | Hayes et al. | 525/63 |
| 5,478,521 | 12/1995 | Scheiner | 264/333 |

Primary Examiner—Paul Marcantoni
Attorney, Agent, or Firm—Stephen D. Harper; William C. Long

[57] ABSTRACT

There is provided a cement composition having improved fluidity comprising cement and an addition copolymer of (a) an adduct of a polyether polyol and an ethylenically unsaturated isocyanate with (b) an ethylenically unsaturated carboxylic acid.

8 Claims, No Drawings

CEMENT COMPOSITION

BACKGROUND OF THE INVENTION

1. Field of the Invention

The present invention relates to cement compositions comprised of cement and an addition copolymer of (a) an adduct of a polyether polyol and an ethylenically unsaturated isocyanate with (b) an ethylenically unsaturated carboxylic acid.

2. Description of the Prior Art

Various additives have been proposed to increase the fluidity of hydraulic cement compositions. U.S. Pat. No. 4,814,014, for example, proposes the use of certain graft copolymers comprised of a polyether backbone having attached side chain polymers formed by polymerization of ethylenically unsaturated monomers as such additives. Illustrative additives are formed of acrylic acid and an oxyethylene/oxypropylene copolymer.

See also U.S. Pat. No. 4,946,904 which proposes cement additives comprising a copolymer of a polyoxyalkylene derivative and maleic anhydride.

U.S. Pat. No. 5,478,521 proposes cement compositions which contain a polymer additive which functions as a dispersant and super plasticizer and which comprises a polymeric backbone moiety and a polymeric side chain moiety, one of which is a polyether moiety and the other is a non-polyether moiety formed by polymerization of ethylenically unsaturated monomers. Polyether backbone moieties are described as are side chain moieties formed by acrylic acid polymerization.

U.S. Pat. No. 4,390,645 describes the addition copolymerization of (a) an adduct of a polyether polyol and an ethylenically unsaturated isocyanate with (b) an ethylenically unsaturated monomer such as styrene or a mixture of styrene and acrylonitrile. These materials are described as useful in the production of a wide variety of polyurethane products. Included among the myriad of possible ethylenically unsaturated monomers are styrene, acrylic acid, maleic anhydride, vinyl esters, vinyl ethers, and the like; only styrene and styrene plus acrylonitrile are exemplified.

BRIEF DESCRIPTION OF THE INVENTION

In accordance with the present invention, cement compositions are provided comprised of hydraulic cement and as a fluidity improving additive an addition copolymer of (a) an adduct of a polyether polyol and an ethylenically unsaturated isocyanate with (b) an ethylenically unsaturated carboxylic acid.

DETAILED DESCRIPTION

In accordance with the invention, a prepolymer is formed by the reaction of a polyether polyol and an ethylenically unsaturated isocyanate.

The polyoxyalkylene polyols most suitable for use in the preparation of the additives used in this invention are the polymerization products of an alkylene oxide or a mixture of alkylene oxides. The functionality of the polyol should be at least about one, but can be varied as desired by changing the structure of the active hydrogen containing initiator or by any other means known in the art. Diols and triols are particularly preferred. Suitable alkylene oxides include, but are not limited to, ethylene oxide, propylene oxide, 1,2-butylene oxide, and the like. Propylene oxide polyols and propylene oxide/ethylene oxide copolyols (either random or endcapped) are most preferred. The polyoxyalkylene polyether polyols may be prepared by any of the methods well-known to those skilled in the art and may contain small amounts of unsaturation. Polyoxyalkylene polyols in which the terminal hydroxyl groups have been replaced with primary or secondary amine groups or with other active hydrogen moieties are also suitable for use in this invention. The number average molecular weight of the polyoxyalkylene polyol is preferably between about 1000 and 10,000 and most preferably is from about 2000 to 7000.

In accordance with the invention, a prepolymer is formed by the reaction of a polyether polyol and an ethylenically unsaturated isocyanate.

The isocyanate vinyl monomer may be any monomer containing at least one vinyl functional group (i.e., a carbon-carbon double bond capable of polymerizing in a free radical manner) and at least one isocyanate functional group.

Suitable isocyanate vinyl monomers may have the following general structure(1):

STRUCTURE 1

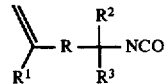

wherein R is a divalent hydrocarbon radical, $R^1$ is hydrogen or methyl, and $R^2$ and $R^3$ separately represent a monovalent hydrocarbon radical. For example, R may be an aromatic ring or an aliphatic chain. The aromatic ring or aliphatic chain may bear additional substituents, as long as such substituents do not interfere with the desired reactivity of the vinyl or isocyanate groups. $R^2$ and $R^3$, may be methyl, ethyl, phenyl, the like.

(1,1-Dialkyl-1-isocyanatomethyl) vinyl aromatic monomers, are one class of isocyanate vinyl monomers particularly suitable for use in this invention. Shown below is (1,1-dimethyl-1-isocyanatomethyl)-m-isopropanol benzene (also known as TMI), a preferred isocyanate vinyl monomer since it is available commercially.

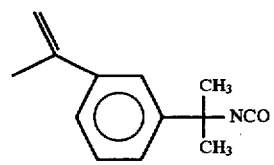

Aromatic isocyanate monomers of Structure 2 are also useful in this invention, where $R^1$, $R^2$, and $R^3$ have the same meaning as in Structure 1.

STRUCTURE 2

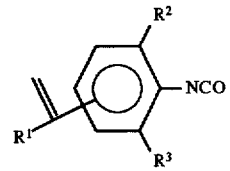

The adduct formed of the polyether polyol and ethylenically unsaturated isocyanate is formed in accordance with known procedures as shown, for example, in U.S. Pat. No. 5,194,493, the disclosure of which is incorporated herein by reference.

The addition copolymer used in practice of the invention can be formed by the general procedures described in U.S. Pat. No. 4,390,645, the disclosure of which is incorporated herein by reference. The ethylenically unsaturated carboxylic acid used in the copolymerization is preferably acrylic acid or methacrylic acid.

The copolymerization is readily carried out by simultaneously adding at a steady or constant rate the carboxylic acid monomer and a free radical catalyst to a mixture of the adduct and the polyether polyol under conditions sufficient to cause free radical addition polymerization. The temperature of the copolymerization is dependent upon the initiator and is preferably in the range from about 25° to about 190° C., most preferably from about 110° to about 130° C., when peroxy-type catalysts are used. Alternatively, the free radical catalyst may be dispersed in a portion of the polyether polyol and thereafter added along with monomer to the remaining portion of the polyether polyol containing the mono-adduct. Other polymerization processes, both continuous and batch, may be suitably employed.

The cements in which the fluidity improving additives are used include ordinary, quick-hardening, and moderate-heat portland cements, alumina cement, blast-furnace slag cement, and flash cement. Of these, Portland cements of the ordinary and quick-hardening types are particularly desirable.

The quantity of additive used may vary with various factors. The quantity of the fluidity improving additive to be used in accordance with the invention is usually in the range of 0.001–5%, preferably 0.01–1%, based on the weight of cement. If the quantity is less than 0.001% by weight, the additive will give only a small fluidity improving effect. If the quantity exceeds 5 wt %, costs of the additive are excessive. The quantity of water to be used for setting the cement can vary; generally weight ratios of water to cement in the range 0.25:1 to 0.7:1, preferably 0.3:1 to 0.5:1, are satisfactory. Where necessary, an aggregate such as pebble, gravel, sand, pumice, or fired perlite may be employed in conventional amounts. The quantity of the fluidity improving additive is usually 0.001–5%, based on the weight of the cement, or usually 0.0003–2% on the basis of the total weight of the cement, additive, water and aggregate combined.

Various other conventional ingredients may also be used. Among the optionally employable ingredients are: conventional hardening accelerators, e.g. metal chlorides such as calcium chloride and sodium chloride, metal sulfates, such as sodium sulfate, and organic amines such as triethanolamine; ordinary hardening retarders, e.g. alcohols, sugars, starch and cellulose; reinforcing-steel corrosion inhibitors such as sodium nitrate and calcium nitrite; water reducing agents and high-range water reducers such as lignosulfonic acids and their salts, and derivatives, hydroxylated carboxylic acids and their salts, condensation products of naphthalenesulfonic acids and formalin, sulfonated melamine polycondensation products, amines and their derivatives, alkanolamines, and inorganic salts such as borates, phosphates, chlorides and nitrates; air entrainers; super plasticizers; shrinkage reducing agents; and the like. The quantity of such an optional ingredient or ingredients is usually 0.01–6% by weight of the cement.

The manner of adding the fluidity improving additive to the cement may be the same as with ordinary cement admixtures. For example, the additive can be admixed with a suitable proportion of water and then this composition mixed with cement and aggregate. As an alternative, a suitable amount of the combination may be added when cement, aggregate and water are mixed.

The concrete and the like incorporating the fluidity-improving agent combination according to the invention may be applied in conventional ways. For example, it may be trowelled, filled in forms, applied by spraying, or injected by means of a caulking gun. Hardening or curing of the concrete and the like may be by any of the air drying, wet air, water and heat-assisted (steam, autoclave, etc.) curing techniques. If desired, two or more such techniques may be combined. The respective curing conditions may be the same as in the past.

The addition to cement of the copolymer in accordance with the invention markedly improves the fluidity of the resulting composition.

The following example illustrate the invention:

EXAMPLE 1

(Preparation of urethane prepolymer)

500 g of a monofunctional polyether, MP1, having a number average molecular weight of about 2000, corresponding to a hydroxyl number of 28 mg KOH/g, made by reacting methanol with ethylene oxide and propylene oxide (70:30 weight ratio) in the presence of an alkali metal hydroxide catalyst was heated to 80° C. in a reaction flask and a mixture of 50 g TMI, dimethyl-m-isopropanol benzyl isocyanate supplied by Cytec Industries, and 0.2 g Coscat83, an organobismuth compound supplied by CosChem Inc., was added slowly and the mixture was then heated for 2 hours at 80° C.

EXAMPLE 2

100 g of the monofunctional polyether, MP1, described in Example 1, was heated to 145° C. in a reaction flask. A mixture of 20 g of the urethane prepolymer from Example 1, 30 g acrylic acid and 1.5 g t-butylperoxybenzoate was added to the reactor over 1 hour at 145° C. Any volatiles remaining at the end of the reaction time were removed by flash evaporation in vacuo.

EXAMPLE 3

50 g of the monofunctional polyether, MP1, described in Example 1, was heated to 145° C. in a reaction flask. A mixture of 70 g of the urethane prepolymer from Example 1, 30 g acrylic acid and 1.5 g t-butylperoxybenzoate was added to the reactor over 1 hour at 145° C. Any volatiles remaining at the end of the reaction were removed by vacuum flash.

EXAMPLE 4

(Comparative)

237 g of the monofunctional polyether, MP1, described in example 1 was heated in a reaction flask. A mixture of 60 g acrylic acid and 3 g t-butyl peroxybenzoate was added dropwise over 1 hour. Remaining volatiles were removed by vacuum flash.

EXAMPLE 5

The reaction products of Examples 1 through 4 were tested in mortar mixes. Slump was measured using a half-size slump cone; air content was determined by ASTM method C185. In a typical preparation, the additive under test was added to the required amount of water; 2700 g sand (ASTM C778 graded) was then added to the mixture followed by 1200 g cement. The procedures of ASTM C305 were used for mixing. Typically the ingredients were mixed for 8 minutes at slow speed with the Hobart mixer. Results are summarized in the Table. As needed, a defoamer such as tri-n-butyl phosphate was added to the mixture so that each batch had an air content comparable to that of the control. Performance of the prepolymer from example 1 was the same as that for the control which had no additive and showed no fluidity-improving properties. The product from comparative example 4 showed some water reduction, as described in U.S. Pat. No. 4,814,014, but, at a given dosage, the product from examples 2 and 3 showed much better water reduction. At 0.2% dosage, for example, water reduction doubled to 14% for example 3 compared to only 7% for example 4. At 0.3% dosage, water reduction was 19% for example 2 compared to 11% for example 4.

For example 2, the additive was converted to the sodium salt and used as a 25% aqueous solution. For example 3, the additive was used as made.

TABLE

| Additive | Water/Cement | wt % additive on dry cement | Slump mm | % Air | % water red | Defoamer (% of additive) |
|---|---|---|---|---|---|---|
| none | 0.52 | — | 102 | 2 | — | none |
| none | 0.50 | — | 83 | 4 | — | none |
| none | 0.48 | — | 59 | 5 | — | none |
| none | 0.45 | — | 44 | 6 | — | none |
| none | 0.42 | — | 24 | 8 | — | none |
| Example 1* | 0.42 | 0.2 | 22 | 7 | none | TBP (3%) |
| Example 2 | 0.42 | 0.1 | 84 | 6 | 16 | TBP (11%) |
| Example 2 | 0.42 | 0.2 | 84 | 10 | ≠ | none |
| Example 2 | 0.42 | 0.3 | 100 | 5 | 19 | TBP (4%) |
| Example 3 | 0.42 | 0.2 | 70 | 5 | 14 | TBP (4%) |
| Example 4* | 0.42 | 0.2 | 44 | 5 | 7 | TBP (4%) |
| Example 4* | 0.42 | 0.3 | 60 | 5 | 11 | TBP (2%) |

*Comparative
≠cannot be compared to other data because air content is much higher

We claim:

1. A cement composition comprising cement and an addition copolymer of (a) an adduct of a polyether polyol and an ethylenically unsaturated isocyanate with (b) an ethylenically unsaturated carboxylic acid.

2. The composition of claim 1 wherein the unsaturated isocyanate is 1,1-dialkyl-1-isocyanatomethyl)-m-isopropanol benzene.

3. The composition of claim 1 wherein the unsaturated acid is acrylic acid.

4. The composition of claim 1 wherein the unsaturated acid is methacrylic acid.

5. The composition of claim 1 wherein the polyether polyol is a propylene oxide polyol or a propylene oxide/ethylene oxide copolyol.

6. The composition of claim 1 wherein the polyether polyol is a polyoxyalkylene polyol having a number average molecular weight of 1000 to 10,000.

7. The composition of claim 1 wherein the unsaturated isocyanate is (1,1-dimethyl-1-isocyanatomethyl)-m-isopropanol benzene.

8. A concrete composition comprising the cement composition of claim 1 together with water and aggregate, and optionally containing other conventional additives.

* * * * *